US009042685B2

(12) United States Patent
Vo et al.

(10) Patent No.: US 9,042,685 B2
(45) Date of Patent: May 26, 2015

(54) PHOTONIC MONITORING FOR OPTICAL SIGNALS

(75) Inventors: Trung Duc Vo, Darlington (AU); William Peter Corcoran, Dulwich Hill (AU); Mark David Pelusi, Camperdown (AU); David James Moss, Croydon (AU); Benjamin John Eggleton, Camperdown (AU); Jochen Bernhard Schroeder, Marrickville (AU)

(73) Assignee: The University of Sydney, New South Wales (AU)

( * ) Notice: Subject to any disclaimer, the term of this patent is extended or adjusted under 35 U.S.C. 154(b) by 192 days.

(21) Appl. No.: 13/806,153

(22) PCT Filed: Jun. 20, 2011

(86) PCT No.: PCT/AU2011/000742
§ 371 (c)(1),
(2), (4) Date: Feb. 17, 2013

(87) PCT Pub. No.: WO2011/160164
PCT Pub. Date: Dec. 29, 2011

(65) Prior Publication Data
US 2013/0209097 A1      Aug. 15, 2013

(30) Foreign Application Priority Data
Jun. 21, 2010   (AU) ................................ 2010902725

(51) Int. Cl.
G02F 1/035  (2006.01)
G02B 6/12   (2006.01)
(Continued)

(52) U.S. Cl.
CPC ........ *H04B 10/07955* (2013.01); *G02B 6/4215* (2013.01); *H04B 10/0795* (2013.01); *H04B 10/07951* (2013.01); *H04B 10/07953* (2013.01); *H04J 14/08* (2013.01)

(58) Field of Classification Search
USPC ............... 385/1-9, 14, 24, 37, 122, 129–132; 398/25–29, 34, 35, 37–38, 43, 79, 81, 398/97, 182, 188, 189, 191; 356/73.1; 216/24
See application file for complete search history.

(56) References Cited

U.S. PATENT DOCUMENTS 6,816,243 B2   11/2004   Surgalin et al.
8,000,610 B2    8/2011   Yao
(Continued)

FOREIGN PATENT DOCUMENTS

CN    1835420      9/2006
JP    11094701     4/1999
JP    2009186606   8/2009

OTHER PUBLICATIONS

A. H. Gnauck and P. J. Winzer, "Optical Phase-Shift-Keyed Transmission," J. Lightw. Technol., vol. 23, No. 1, pp. 115-130, Jan. 2005.
(Continued)

*Primary Examiner* — Akm Enayet Ullah
*Assistant Examiner* — Michael Mooney
(74) *Attorney, Agent, or Firm* — Troutman Sanders, LLP; Ryan A. Schneider (57) ABSTRACT

This invention concerns real-time multi-impairment signal performance monitoring. In particular it concerns an optical device, for instance a monolithic integrated photonics chip, comprising a waveguide having an input region to receive a signal for characterization, and a narrow band CW laser signal. A non-linear waveguide region to mix the two received signals. More than one output region, each equipped with bandpass filters that extract respective discrete frequency bands of the RF spectrum of the mixed signals. And, also comprising (slow) power detectors to output the extracted discrete frequency banded signals.

18 Claims, 7 Drawing Sheets

(51) Int. Cl.

| | |
|---|---|
| G02B 6/34 | (2006.01) |
| G02B 6/00 | (2006.01) |
| G02B 6/10 | (2006.01) |
| H04B 17/00 | (2006.01) |
| H04B 10/00 | (2013.01) |
| B29D 11/00 | (2006.01) |
| H04B 10/079 | (2013.01) |
| G02B 6/42 | (2006.01) |
| H04J 14/08 | (2006.01) |

(56) References Cited

U.S. PATENT DOCUMENTS

| | | |
|---|---|---|
| 2006/0153498 A1 | 7/2006 | Shen |
| 2008/0075457 A1 | 3/2008 | Skoog et al. |

OTHER PUBLICATIONS

C. Schmidt-Langhorst, R. Ludwig, D.-D. Groβ, L. Molle, M. Seimetz, R. Freund, and C. Schubert, "Generation and Coherent Time-Division Demultiplexing of up to 5.1 Tb/s Single-Channel 8-PSK and 16-QAM Signals," in Proc. Optical Fiber Communication Conference (OFC), San Diego, USA, Paper PDPC6, 2009 (Postdeadline Paper).

H. C. H. Mulvad, M. Galili, L. K. Oxenløwe, H. Hu, A. T. Clausen, J. B. Jensen, C. Peucheret, and P. Jeppesen, "Demonstration of 5.1 Tbit/s data capacity on a single-wavelength channel," Opt. Express, vol. 18, No. 2, pp. 1438-1443, Jan. 2010.

A. D. Ellis, J. Zhao, and D. Cotter, "Approaching the Non-Linear Shannon Limit," J. Lightw. Technol., vol. 28, No. 4, pp. 423-433, Feb. 2010.

A. Sano, H. Masuda, T. Kobayashi, M. Fujiwara, K. Horikoshi, E. Yoshida, Y. Miyamoto, M. Matsui, M. Mizoguchi, H.Yamazaki, Y. Sakamaki, and H. Ishii, "69.1-Tb/s (432 × 171-Gb/s) C- and Extended L-Band Transmission over 240 Km Using PDM-16-QAM Modulation and Digital Coherent Detection,," in Proc. Optical Fiber Communication Conference (OFC), San Diego, USA, Paper PDPB7, 2010 (Postdeadline Paper).

A. H. Gnauck, P. J. Winzer, S. Chandrasekhar, X. Liu, B. Zhu, and D. W. Peckham, "10 × 224-Gb/s WDM Transmission of 28-Gbaud PDM 16-QAM on a 50-GHz Grid Over 1,200 Km of Fiber," in Proc. Optical Fiber Communication Conference (OFC), San Diego, USA, Paper PDPB8, 2010 (Postdeadline Paper).

X. Zhou, J. Yu, M.-F. Huang, Y. Shao, T. Wang, L. Nelson, P. Magill, M. Birk, P. I. Borel, D. W. Peckham, and R. Lingle, "64-Tb/s (640×107-Gb/s) PDM-36QAM Transmission over 320km Using Both Pre- and Post-Transmission Digital Equalization," in Proc. Optical Fiber Communication Conference (OFC), San Diego, USA, Paper PDPB9, 2010 (Postdeadline Paper).

J.-X. Cai, Y. Cai, C. Davidson, D. Foursa, A. Lucero, O. Sinkin, W. Patterson, A. Pilipetskii, G. Mohs, and N. Bergano,."Transmission of 96×100G Pre-Filtered PDM-RZ-QPSK Channels with 300% Spectral Efficiency over 10,608km and 400% Spectral Efficiency over 4,368km," in Proc. Optical Fiber Communication Conference (OFC), San Diego, USA, Paper PDPB10, 2010 (Postdeadline Paper).

D. C. Kilper, R. Bach, D. J. Blumenthal, D. Einstein, T. Landolsi, L. Ostar, M. Preiss, and A. E. Willner, "Optical Performance Monitoring," J. Lightw. Technol., vol. 22, No. 1, pp. 294-304, Jan. 2004.

Z. Pan, C. Yu, and A. E. Willner, "Optical performance monitoring for the next generation optical communication networks," Opt. Fiber Technol., vol. 16, No. 1, pp. 20-45, Jan. 2010.

J. Zhao, A. P. T. Lau, K. K. Qureshi, Z. Li, C. Lu, and H. Y. Tam, "Chromatic Dispersion Monitoring for DPSK Systems Using RF Power Spectrum," J. Lightw. Technol., vol. 27, No. 24, pp. 5704-5709, Dec. 2009.

C. Dorrer and X. Liu, "Noise Monitoring of Optical Signals Using RF Spectrum Analysis and Its Application to Phase-Shift-Keyed Signals," IEEE Photon. Technol. Lett., vol. 16, No. 7, pp. 1781-1783, Jul. 2004.

H. Y. Choi, Y. Takushima, and Y. C. Chung, "Optical performance monitoring technique using asynchronous amplitude and phase histograms," Opt. Express, vol. 17, No. 26, pp. 23953-23958, Dec. 2009.

Z. Li, C. Lu, Y. Wang, and G. Li, "In-service signal quality monitoring and multi-impairment discrimination based on asynchronous amplitude histogram evaluation for NRZ-DPSK systems," IEEE Photon. Technol. Lett., vol. 17, No. 9, pp. 1998-2000, Sep. 2005.

Z. Li and G. Li, "Chromatic Dispersion and Polarization-Mode Dispersion Monitoring for RZ-DPSK Signals Based on Asynchronous Amplitude-Histogram Evaluation," J. Lightw. Technol., vol. 24, No. 7, pp. 2859-2866, Jul. 2006.

T. B. Anderson, A. Kowalczyk, K. Clarke, S. D. Dods, D. Hewitt, and J. C. Li, "Multi Impairment Monitoring for Optical Networks," J. Lightw. Technol., vol. 27, No. 16, pp. 3729-3736, Aug. 2009.

D. A. Reid, K. Bondarczuk, K. J. Dexter, K. Shi, P. M. Anandarajah, L. P. Barry, W.-H. Guo, J. O'Dowd, M. Lynch, A. L. Bradley, and J. F. Donegan, "Two-Photon-Absorption-Based OSNR Monitor for NRZ-PSK Transmission Systems," IEEE Photon. Technol. Lett., vol. 22, No. 5, pp. 275-277, Mar. 2010.

X. Liu, Y.-H. Kao, S. Chandrasekhar, I. Kang, S. Cabot, and L. L. Buhl, "OSNR monitoring method for OOK and DPSK based on optical delay interferometer," IEEE Photon. Technol. Lett., vol. 19, No. 15, pp. 1172-1174, Aug. 2007.

D. Dahan, U. Mahlab, and D. Levy, "Stimulated Brillouin scattering based in-band OSNR monitoring technique for 40 Gbps and 100 Gbps optical transparent networks" in Optics Express, vol. 18, Issue 15, pp. 15769-15783 (2010).

J.-Y. Yang, L. Zhang, X. Wu, O. F. Yilmaz, B. Zhang, and A. E. Willner, "All-Optical Chromatic Dispersion Monitoring for Phase-Modulated Signals Utilizing Cross-Phase Modulation in a Highly Nonlinear Fiber," IEEE Photon. Technol. Lett., vol. 20, No. 19, pp. 1642-1644, Oct. 2008.

T. D. Vo, M. D. Pelusi, J. Schröder, B. Corcoran, and B. J. Eggleton, "Multi-Impairment Monitoring at 320 Gb/s based on Cross Phase Modulation Radio-Frequency Spectrum Analyzer," IEEE Photon. Technol. Lett., 2010.

T. D. Vo, M. D. Pelusi, J. Schröder, F. Luan, S. J. Madden, D.-Y. Choi, D. A. P. Bulla, B. Luther-Davies, and B. J. Eggleton, "Simultaneous multi-impairment monitoring of 640 Gb/s signals using photonic chip based RF spectrum analyzer," Opt. Express, vol. 18, No. 4, pp. 3938-3945, Feb. 2010.

T. D. Vo, H. Hu, M. Galili, E. Palushani, J. Xu, L. K. Oxenløwe, S. J. Madden, D. Y. Choi, D. A. P. Bulla, M. D. Pelusi, J. Schröder, B. Luther-Davies, and B. J. Eggleton, "Photonic Chip Based 1.28 Tbaud Transmitter Optimization and Receiver OTDM Demultiplexing," in Proc. Optical Fiber Communication Conference (OFC), San Diego, USA, Papers PDPC5, 2010 (Postdeadline paper).

G. P. Agrawal, Nonlinear Fiber Optics, 3rd ed.: California: Academic Press, 2001.

C. Dorrer and D. N. Maywar, "RF Spectrum Analysis of Optical Signals Using Nonlinear Optics," J. Lightw. Technol., vol. 22, No. 1, pp. 266-274, Jan. 2004.

A. F. Elrefaie, R. E. Wagner, D. A. Atlas, and D. G. Daut, "Chromatic Dispersion Limitations in Coherent Lightwave Transmission Systems," J. Lightw. Technol., vol. 6, No. 5, pp. 704-709, May 1988.

M. D. Pelusi, T. D. Vo, F. Luan, S. J. Madden, D.-Y. Choi, D. A. P. Bulla, B. Luther-Davies, and B. J. Eggleton, "Terahertz bandwidth RF spectrum analysis of femtosecond pulses using a chalcogenide chip," Opt. Express, vol. 17, No. 11, pp. 9314-9322, May 2009.

J. M. Harbold, F. Ö. Ilday, F. W. Wise, J. S. Sanghera, V. Q. Nguyen, L. B. Shaw, and I. D. Aggarwal, "Highly nonlinear As—S—Se glasses for all-optical switching," Opt. Lett., vol. 27, No. 2, pp. 119-121, Jan. 2002.

D.-Y. C. S. Madden, D. A. Bulla, R. Wang, A. Rode, and B. Luther-Davies, "Submicrometer-Thick Low-Loss As2S3 Planar Waveguides for Nonlinear Optical Devices," IEEE Photon. Technol. Lett., vol. 22, No. 7, pp. 495-497, Apr. 2010.

M. Pelusi, F. Luan, T. D. Vo, M. R. E. Lamont, S. J. Madden, D. A. Bulla, D. Y. Choi, B. Luther-Davies, and B. J. Eggleton, "Photonic-chip-based radio-frequency spectrum analyser with terahertz bandwidth," Nature Photon., vol. 3, No. 3, pp. 139-143, Feb. 2009.

(56) References Cited

OTHER PUBLICATIONS

M. D. Pelusi, F. Luan, E. Magi, M. R. Lamont, D. J. Moss, B. J. Eggleton, J. S. Sanghera, L. B. Shaw, and I. D. Aggarwal, "High bit rate all-optical signal processing in a fiber photonic wire," Opt. Express, vol. 16, No. 15, pp. 11506-11512, Jul. 2008.

M. A. F. Roelens, S. Frisken, J. A. Bolger, D. Abakoumov, G. Baxter, S. Poole, and B. J. Eggleton, "Dispersion Trimming in a Reconfigurable Wavelength Selective Switch," J. Lightw. Technol., vol. 26, No. 1, pp. 73-78, Jan. 2008.

International Search Report mailed Nov. 22, 2011 for priority application PCT/AU2011/000742.

Written Opinion of the International Searching Authority completed Nov. 18, 2011 for priority application PCT/AU2011/000742.

Abstract of CN1835420 from Espacenet, accessed Jan. 30, 2015.

Abstract and translation of JP11-094701 from Patent Abstracts of Japan, accessed Feb. 11, 2015.

Abstract and translation of JP2009-186606 from Patent Abstracts of Japan, accessed Feb. 11, 2015.

Pelusi et al, *Ultra-Broadband (THz) RF Spectrum Monitoring of High-Speed Optical Signals using a Chalcogenide Waveguide Chip*, Optical SOC'Y AM. (2009).

PHOTONIC MONITORING FOR OPTICAL SIGNALS

BENEFIT CLAIMS

This application is a US National Stage of International Application No. PCT/AU2011/000742, filed 20 Jun. 2011, which claims the benefit of AU 2010902725, filed 21 Jun. 2010.

TECHNICAL FIELD

This invention concerns photonic monitoring for optical signals, in particular for real-time multi-impairment signal performance monitoring.

BACKGROUND ART

Traditional optical transmission systems have primarily employed a conventional intensity modulation format, i.e. on-off keying (OOK), due to its simplicity at both transmitter and receiver. Recently advanced coherent modulation formats such as differential phase shift keying (DPSK), differential quadrature phase shift keying and m-array phase shift keying [1-4] have attracted increased attention. In coherent communications networks, data is encoded into the phase instead of intensity of the optical signals, providing numerous advantages over the traditional OOK format, including robustness, better tolerance to nonlinearity and crosstalk, increased receiver sensitivity and spectral efficiency [1]. Due to these advantages, many research laboratories have exploited advanced modulation formats for ultra-high bit-rate and long-haul transmission systems [5-8].

Despite the robustness of coherent optical systems, reliable optical performance monitoring (OPM) [9, 10] is still a critical part of network infrastructure. In particular, for quality of service assurance and optimal network performance. Conventionally, DPSK signals are demodulated and detected for performance monitoring by a Mach-Zehnder (MZ) delay interferometer and a high-speed balanced receiver, respectively [1], adding a significant cost and complexity to the network.

Several relatively simple OPM techniques have been reported to monitor impairments of phase modulated optical signals. These include single impairment monitoring methods for group velocity dispersion (GVD) [11] and optical signal-to-noise ratio (OSNR) monitoring [12] using the radio-frequency (RF) power spectra, and amplitude and phase Q-factor measurement using asynchronous amplitude and phase histograms [13]. Moreover, multi-impairment monitoring schemes, including GVD and OSNR monitoring using asynchronous amplitude histogram evaluation [14]. GVD and first-order polarization mode dispersion (PMD) monitoring using asynchronous amplitude histogram evaluation [15] or asynchronous delay tap sampling [16] have been established. However, these conventional electro-optic based monitoring schemes reply on high-speed detectors, thus their typical operating bandwidth is limited to about 100 GHz and costs remain relatively high.

Besides the above methods, a variety of all-optical OPM schemes that work for high speed phase-encoded optical signals have been presented. These include OSNR monitoring using two-photon-absorption in a semiconductor micro-cavity [17] and an optical delay interferometer [18]. Alternatively all-optical signal processing based on nonlinear optics is considered as a method to overcome the limitations imposed by the electronic bandwidth. Several monitoring methods, including GVD monitoring using cross-phase modulation (XPM) in a highly nonlinear fiber (HNLF) [20] have been presented. Although impressive results have been obtained, these techniques do not offer multi-impairment monitoring functionality which is essential for next generation optical communication networks.

DISCLOSURE OF THE INVENTION

The invention is an optical device, for instance a monolithic integrated photonics chip, comprising a waveguide having:
  An input region to receive a signal for characterization, and a narrow band CW laser signal.
  A non-linear waveguide region to mix the two received signals.
  More than one output region, each equipped with bandpass filters that extract respective discrete frequency bands of the RF spectrum of the mixed signals.
  And, also comprising (slow) power detectors to output the extracted discrete frequency banded signals.

This arrangement enables real-time impairment monitoring functionality, and it may be realized in a compact and low cost chip that integrates the input, non-linear waveguide and output regions of the device. In particular it also offers high sensitivity and multi-impairment monitoring without ambiguities for microwave and photonics applications.

A semiconductor laser may also be integrated on the chip to provide the narrow band CW laser signal.

The mixing of the two received signals produces cross-phase modulation between them.

The integrated bandpass filters may be etched onto the waveguide using lithographic techniques. The filters may be Bragg gratings, or Array Waveguide gratings (AWG).

The use of more than one output region allows for simultaneous monitoring of a number of different signal impairments. For instance two output regions may monitor both GVD and ONSR.

The waveguide may be a dispersion engineered, highly nonlinear Chalcogenide (ChG) rib waveguide, which offers THz bandwidth by exploiting its femtosecond response time of the Kerr nonlinearity in the mm scale. The monolithic integrated photonics chip may be fabricated in silicon. The waveguide may also be fabricated in silicon modified for high speed use.

The features observed on the RF spectrum may be directly utilized to perform simultaneous group velocity dispersion and in-band optical signal-to-noise ratio monitoring.

Based on the relationship between signal impairments and the RF spectra or autocorrelation traces, the chip may be used to monitor GVD, OSNR and timing jitter simultaneously with high measurement dynamic ranges.

The chip may be used to monitor on-off keying as well as advanced modulation formats including;
  differential phase shift keying (DPSK)
  differential quadrature phase shift keying (QPSK)
  Optical time division multiplexing (OTDM)

BRIEF DESCRIPTION OF THE DRAWINGS

An example of the invention will now be described with reference to the accompanying drawings, in which.

BEST MODES OF THE INVENTION

I. Operating Principle

A. RF Spectrum Monitoring

Figure 1:
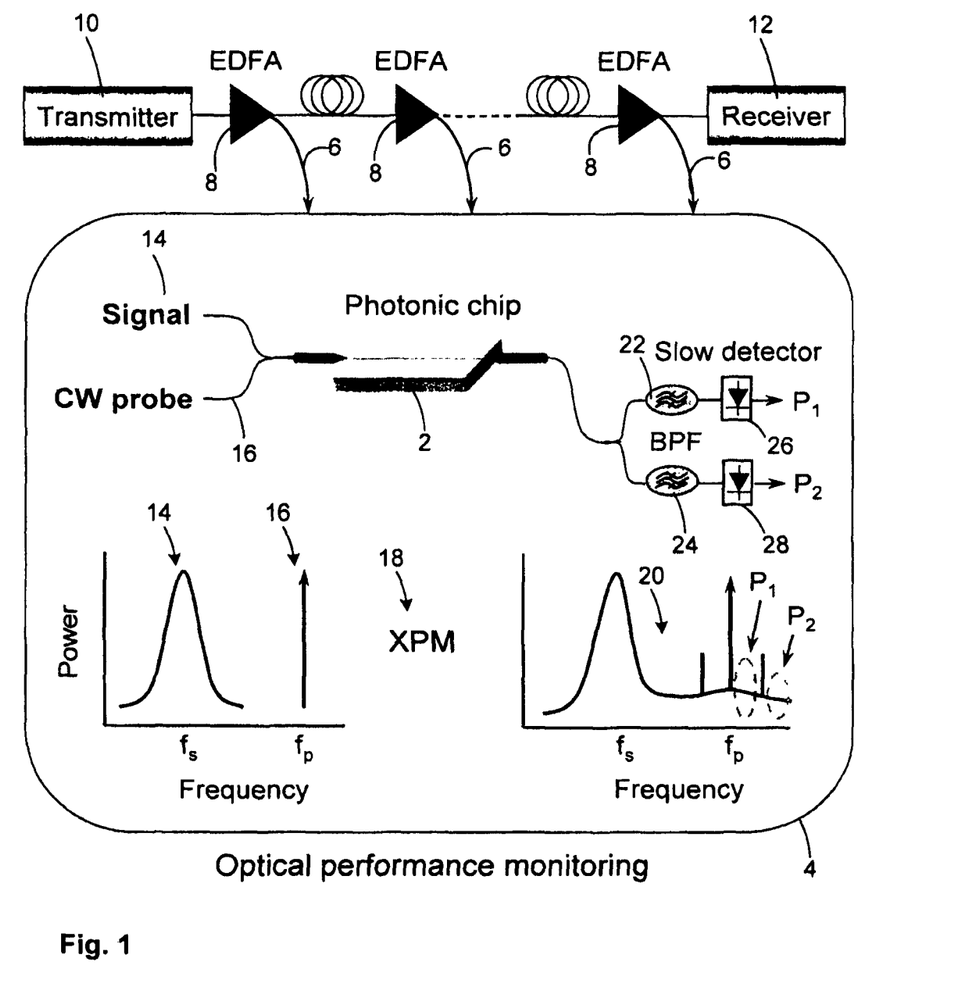
FIG. 1 is a schematic diagram of a chip based RF spectrum analyzer, which monitors multiple impairments simultaneously.
  This OPM approach is suitable to be operated after in-line EDFAs.

FIG. 1 depicts a schematic of a photonic chip 2 based RF analyzer 4 which receives input signals 6 from in line Erbium Doped Filter Amplifiers (EDFA) 8 travelling from a transmitter 10 to a receiver 12. A Signal Under Test (SUT) 14 at center frequency $f_s$ is co-propagated through the nonlinear waveguide 2 with a narrow band Continuous Wave (CW) beam 16 at frequency $f_p$. Cross phase modulation (XPM) [24] 18 caused by the optical Kerr effect induces a phase-modulation proportional to the instantaneous intensity of the signal onto the co-propagating CW probe field. The XPM thus maps the rapid fluctuations of the signal intensity onto the phase of the CW probe, broadening its optical spectrum as new frequencies are generated around the probe frequency 20. Note that the frequency separation between $f_s$ and $f_p$ has to be sufficiently large to avoid spectral interference. The probe field $E_p'(t)$ at the output of the nonlinear waveguide thus becomes $$E'_p(t) = E_p(t) \cdot \exp(j\phi_{NL}(t)) \quad (1)$$

where $E_p(t)$ is the initial electric field of the probe and $\phi_{NL}(t)$ is the nonlinear phase shift which is proportional to the signal intensity I(t) according to $$\phi_{NL}(t) = 2\gamma \cdot I(t) \cdot L \quad (2)$$

with the nonlinear coefficient $\gamma = (2\pi \cdot n_2)/\lambda \cdot A_{eff}$ [24] and the nonlinear propagation length L. By Taylor series expansion of the term $\exp[j \cdot \phi_{NL}(t)]$ with the assumption of $\phi_{NL}(t) \ll 1$, the electric field of a probe becomes $$E'_p(t) \approx E_p(t) \cdot [1 + j\phi_{NL}(t)] \quad (3)$$

The optical spectrum of the CW-probe after propagating through the waveguide is therefore proportional to the power spectrum of the signal under test (SUT) [25]

$$S_p(f) |F[E'_p(t)]|^2 \propto |f I(t) \exp(j2\pi(f-f_p)t dt|^2 = |F[I(t)]|^2 \quad (4)$$

It is thus possible to capture the RF spectrum of a system under test by measuring the optical spectrum of the probe. The bandwidth of this technique is determined by the nonlinear response time of the medium and the group-velocity-mismatch-induced walk-off between pump 14 and probe 16. Optical Band Pass Filters (BPF) 22 and 24 and power meters 26 and 28, are employed to capture the optical spectrum and extract power signals $P_1$ and $P_2$ for impairments measurement. In this way a simple, monolithic, instantaneous measurements of $P_1$ and $P_2$ can be made. Where power $P_1$ is extracted from a band of low frequencies around the first fundamental clock tones, while $P_2$ is extracted from a band of high frequencies in the RF spectrum. It is beneficial to take the signal input after amplification by the EDFA 8 because of the high power requirements of the XPM 18.

B. Multi-Impairment Performance Monitoring

Figure 2:
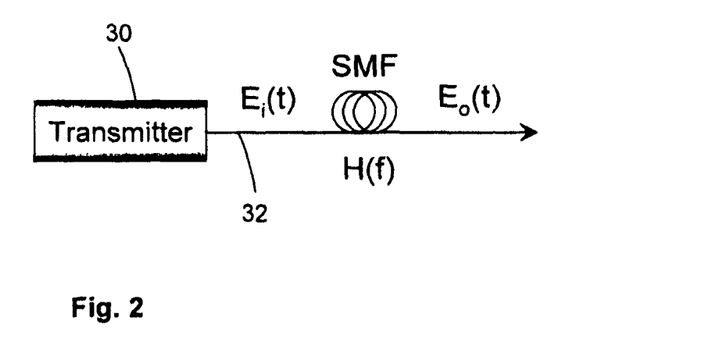
FIG. 2 is a transmission system diagram.

FIG. 2 depicts a basic Digital Phase Shift Key (DPSK) transmission and monitoring system. The phase-encoded optical signal from transmitter 30 at the input of the standard single mode fiber (SMF) 32 is defined as [26]

$$E_i(t) = \sum_k a_k p(t - kT) \quad (5)$$

where $\alpha_k = \pm 1$, T is the bit period and p(t) is the pulse function. The transfer function of a SMF without amplified spontaneous emission (ASE) noise, PMD and Kerr nonlinearity is given by [26]

$$H(f) = \exp(j2\pi^2 \beta_2 L f^2) \quad (6)$$

where $\beta_2$ is GVD parameter and L is the fiber length. The optical signal at the output of the SMF is a convolution between the input signal and impulse response of the fiber $$E_o(t) = E_{in}(t) * h(t) = E_{in}(t) * \{F^{-1}[H(f)]\} \quad (7)$$

According to [11] the RF spectrum of an optical signal as a function of frequency f at the output of the SMF thus becomes $$S(f) = |F(|E_o(t)|^2)|^2 = B \sum_{n \neq 0} |G_n(f)|^2 + B \cdot K(f) \sum_n \exp(j2\pi nTf) \quad (8)$$

where B=1/T is the bit-rate of the optical signal, $G_n(f)$ and K(f) are defined as [11]

$$G_n(f) = F(E_o(t) \cdot E_o^*(t + nT)) \quad (9)$$

$$K(f) = F\left( \int_{-\infty}^{+\infty} |E_o(t)|^2 |E_o(t - n\tau)|^2 \, dt \right) \quad (10)$$

Note that equation (9) depends on the frequencies of the input signal and new frequencies generated by transmission impairments. If the ASE noise is included in this transmission system, the total RF spectrum at the output of a SMF fiber is [12]

$$S(f) = S_{signal}(f) + S_{ASE}(f) + S_{signal-ASE}(f) \quad (11)$$

where $S_{signal}(f)$, $S_{ASE}(f)$ and $S_{signal-ASE}(f)$ are the RF spectra of the optical signal, ASE noise and signal-ASE beat noise, respectively.

C. Chalcogenide Planar Waveguide

An accurate measurement of multiple impairments using this OPM scheme requires sufficient bandwidth of the RF spectrum analyzer. Here we employ a highly nonlinear, dispersion-shifted Chalcogenide (ChG) planar waveguide to enhance measurement performance [27]. The ChG planar waveguide offers many advantages, including a high nonlinear response due to large ultra-fast Kerr nonlinear index coefficient $n_2$ (greater than 100 times of silica [28]) and a small effective core area $A_{eff}$ of ~1.2 $\mu m^2$ for the transverse-magnetic (TM) mode [29]. Therefore the nonlinear coefficient $\gamma$ is about 9900 $W^{-1}km^{-1}$ and the large, normal dispersion is offset to an anomalous dispersion of ~28.6 ps/nm/km at 1550 nm. The combination of low dispersion and short propagation length of 6.8 cm provides ultra-low walk-off, thus enabling a THz measurement bandwidth [30, 31]. This allows the characterization and performance monitoring of high-speed optical signals [22, 23].

II. Experiments and Results

A. Experimental Setup

Figure 3:
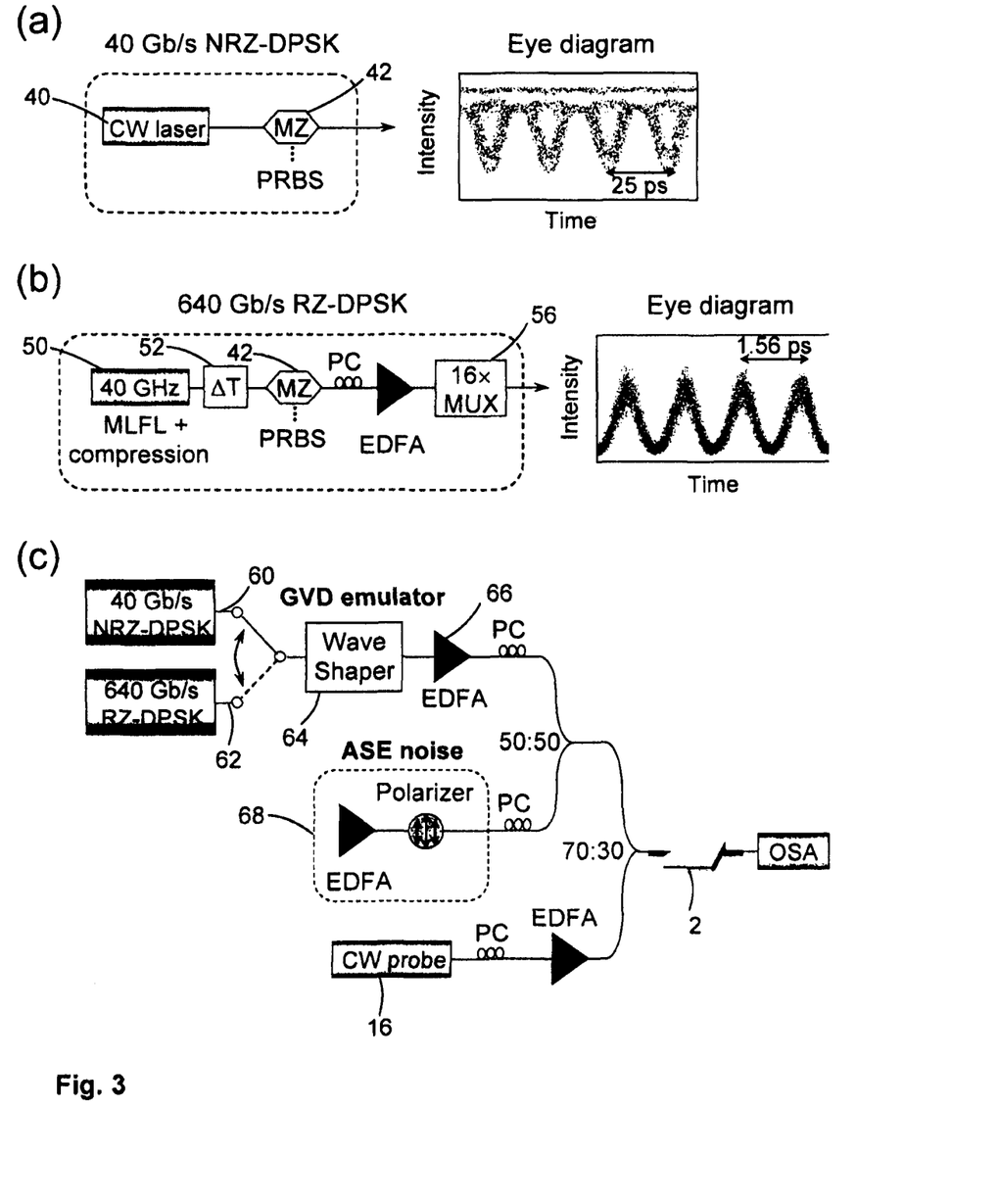
FIG. 3(a) is a diagram of the experimental setup for 40 Gbit/s NRZ-DPSK.
FIG. 3(b) is a diagram of the experimental setup for 640 Gbit/s RZ-DPSK optical signals generation.
FIG. 3(c) is a diagram of the experimental setup for monitoring GVD and in-band OSNR of the DPSK signals simultaneously.

We generate a 40 Gbit/s NRZ-DPSK signal using a CW laser source 40 at $\lambda_s$=1543 nm and a DPSK MZ modulator 42, driven by a 40 Gbit/s pseudorandom bit sequence (PRBS) of $2^{31}$–1 pattern length; shown in FIG. 3(a). Although optical intensity dips are observed on the eye diagram at the output of the MZ modulator due to the effects of drive waveform imperfections, the phase information of this optical signal is left intact [1].

FIG. 3(b) depicts a 640 Gbit/s RZ-DPSK signal generation setup. A 40 GHz pulse train from a mode-locked fiber laser 50 at $\lambda_s$=1542.5 nm (with ~550 fs pulse width after a nonlinear compression) was data encoded with the same MZ modulator 42 to produce a 40 Gbit/s RZ-DPSK data stream. An optical delay line ($\Delta T$) 52 was used to align the data to the pulses. The 640 Gbit/s DPSK signal, whose eye diagram was captured via an optical sampling oscilloscope, was generated from the 40 Gbit/s data via four-stage optical time division multiplexing (MUX) 56.

FIG. 3(c) shows the experimental setup for the simultaneous multi-impairment monitoring of phase-encoded optical signals. The 40 Gbit/s NRZ-DPSK 60 and 640 Gbit/s RZ-DPSK signals 62 were coupled with optical impairments, e.g. GVD and ASE noise, which were produced from a Finisar WaveShaper [32] 64 and an erbium doped fiber amplifier (EDFA) 66, respectively. Note that an in-line polarizer 68 was used to ensure signal and ASE noise were co-polarized. The degraded signal ($P_{ave}$=33 mW) and a CW probe ($P_{ave}$=30 mW, $\lambda_p$=1550 nm for 40 Gbit/s NRZ-DPSK and $\lambda_p$=1570 nm for 640 Gbit/s RZ-DPSK) were aligned to the TM mode using polarization controllers (PC) 68 and co-propagated through the planar waveguide 2 via coupling using a pair of lensed fibers. The total insertion loss was ~11.3 dB.

B. 40 Gbit/s NRZ-DPSK Monitoring

Figure 4:
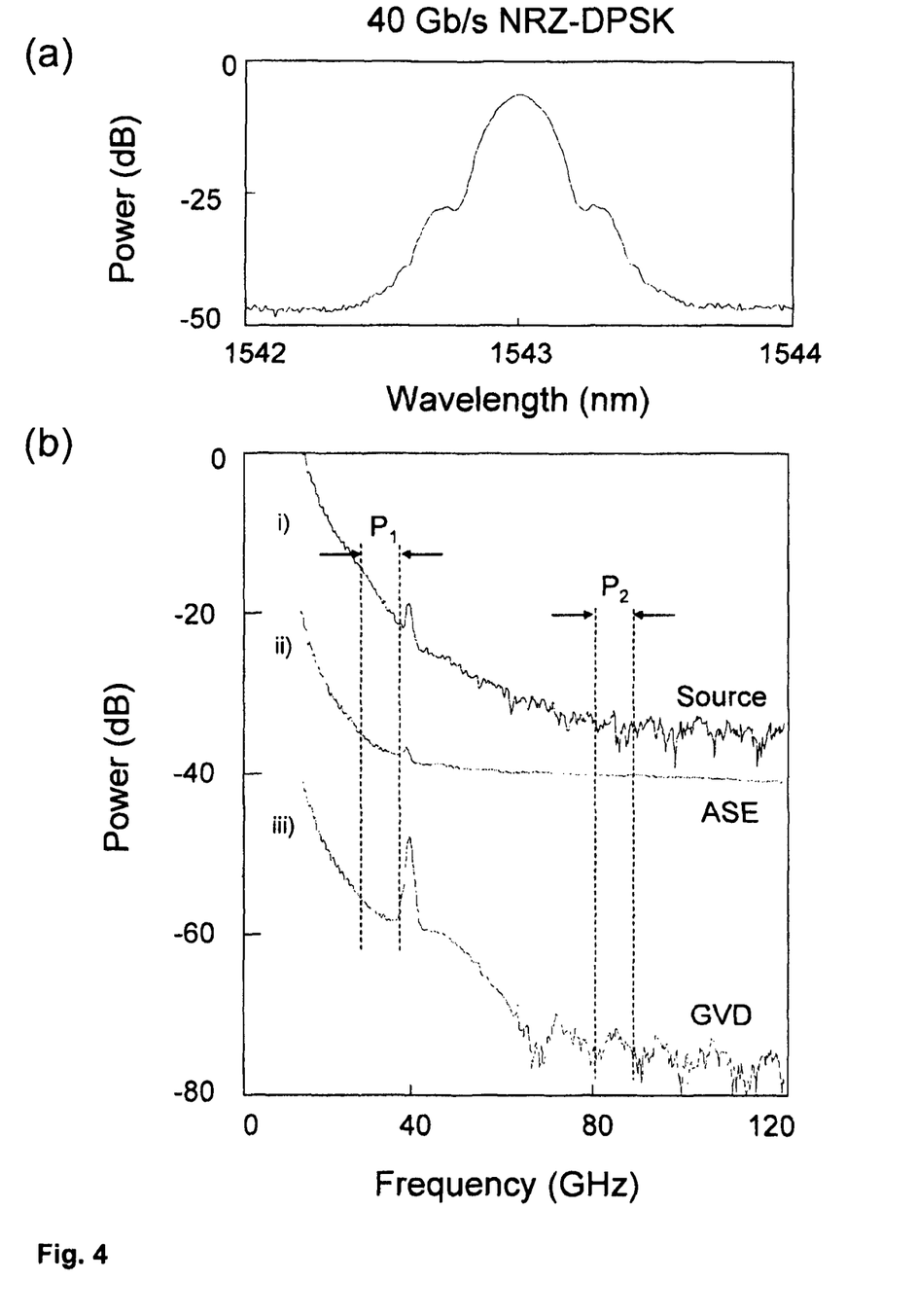
FIG. 4(a) is a graph of the optical spectrum.
FIG. 4(b) is a graph of the RF spectra of a 40 Gbit/s NRZ-DPSK signal, captured via chip based RF spectrum analyzer under different conditions:
(i) no impairment,
(ii) ASE noise and
(iii) GVD.

FIG. 4 shows the optical and RF spectra of a 40 Gbit/s NRZ-DPSK optical signal with three different conditions: no impairment, ASE noise and GVD. We define $P_1$ and $P_2$ as the RF power at lower and higher frequencies, respectively as indicated in FIG. 4(b). The bandwidths for $P_1$ and $P_2$ measurements are the same in our experiments. We observed power $P_1$ in the RF spectrum increases according to an increase of GVD while ASE noise raise power $P_2$ at further frequency. Note that the GVD effect only changes the temporal waveform of the signal and thus the RF spectrum, but not the optical spectrum.

We exploit the relationship between signal impairments of GVD and ASE noise on the RF power spectra to determine their impact simultaneously. We calculate $P_1$ and $P_2$ by integrating the powers over a bandwidth of 10 GHz in the RF spectrum captured from a conventional optical spectrum analyzer (OSA); the same function could be performed using two sharp and narrow optical BPFs. This would simplify the implementation compared to autocorrelation approaches [21, 22] and facilitate real-time monitoring.

Figure 5:
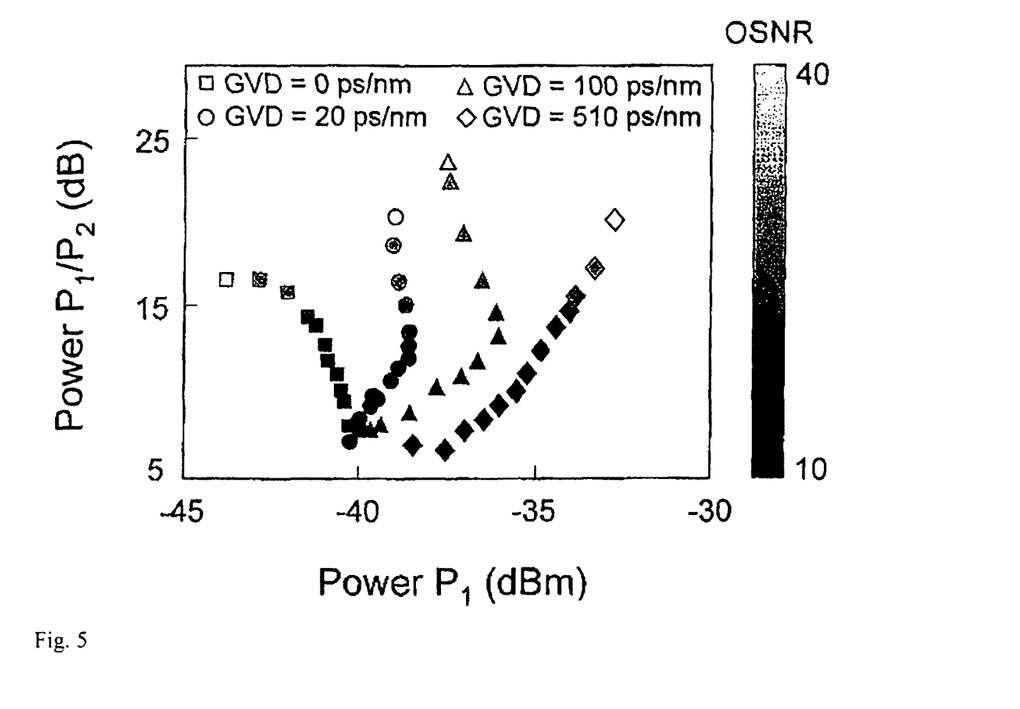
FIG. 5 is a plot of GVD and in-band OSNR measurements of 40 Gbit/s NRZ-DPSK data.

In FIG. 5, we map the power $P_1$ against the power ratio $P_1/P_2$. Each point on this map uniquely defines both OSNR and GVD; thus enabling their respective values to be determined simultaneously. We achieved very high GVD monitoring range of up to 510 ps/nm and the OSNR range is ~30 dB.

C. 640 Gbit/s RZ-DPSK Monitoring

Figure 6:
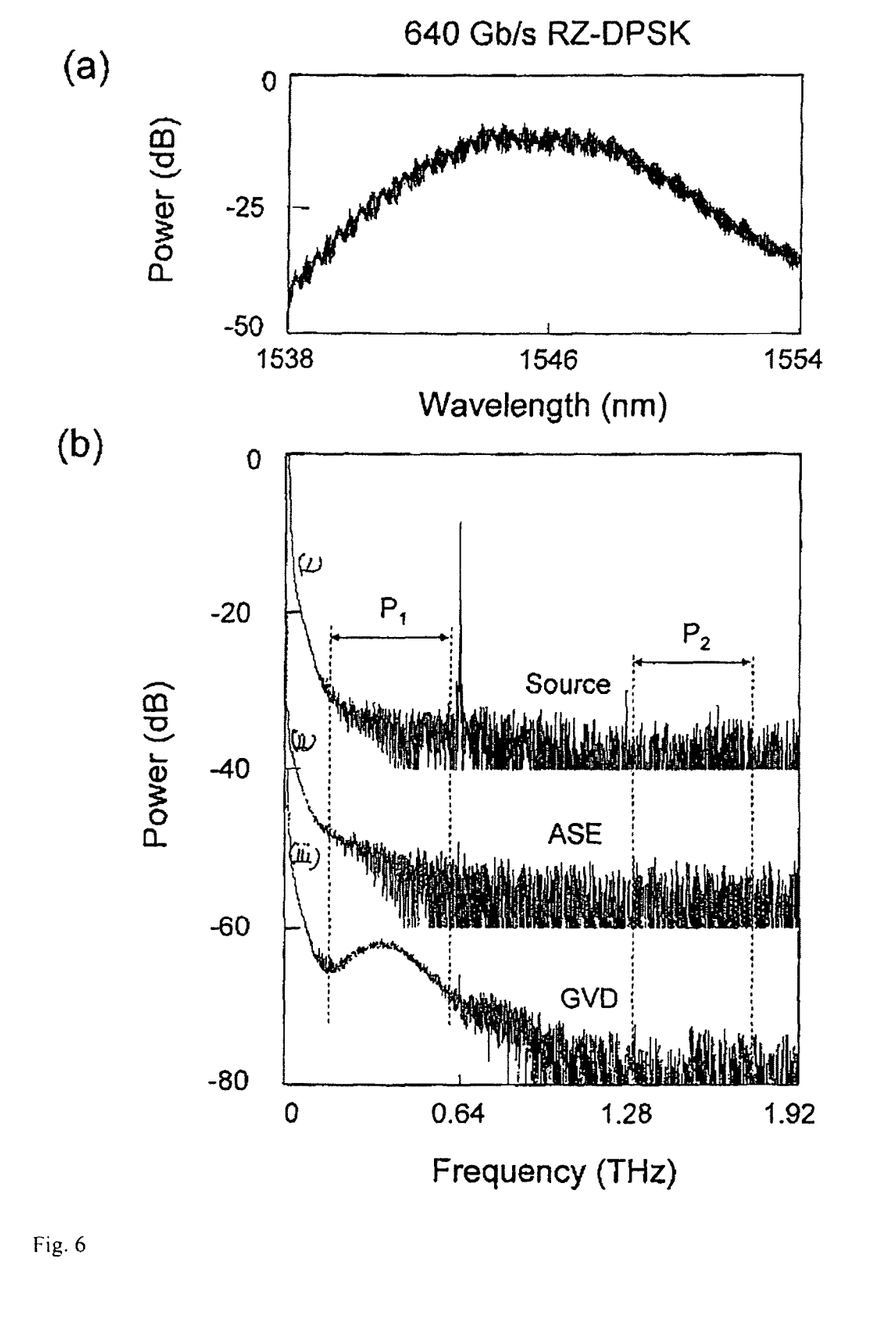
FIG. 6(a) is a graph of the optical spectrum.
FIG. 6(b) is a graph of the RF spectra of:
(i) a 640 Gbit/s RZ-DPSK signal with no impairment,
(ii) ASE noise and
(iii) GVD.

FIG. 6(a) shows the optical spectrum and FIG. 6(b) depicts the effects of GVD and ASE noise on the RF spectrum of a 640 Gbit/s RZ-DPSK optical signal.

Figure 7:
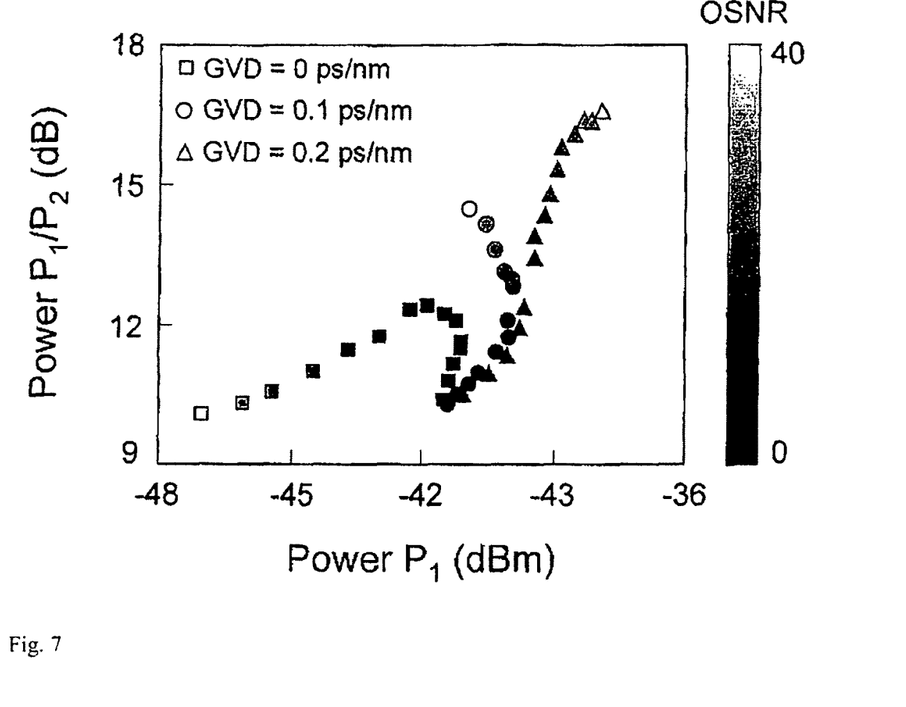
FIG. 7 is a series of plots of GVD and in-band OSNR measurements of 640 Gbit/s RZ-DPSK data.

FIG. 7 presents GVD and OSNR monitoring results of this 640 Gbit/s phase-encoded to signal based on the specific features on RF spectra. The measuring bandwidth of $P_1$ and $P_2$ is 480 GHz. Here, GVD and OSNR monitoring ranges are about 0.2 ps/nm and 40 dB, respectively.

Figure 8:
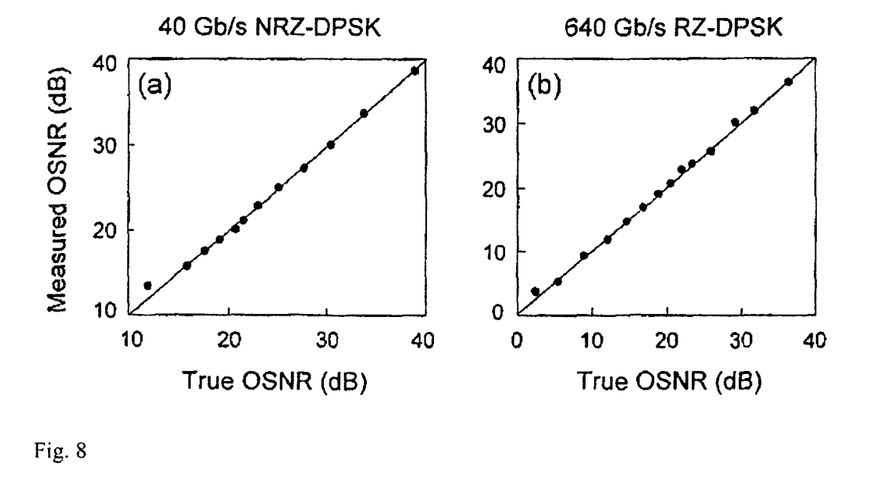
FIG. 8(a) is a graph of OSNR values measured from our method as a function of actual OSNR obtained from an OSA (in case of no GVD) for (a) 40 Gbit/s DPSK signals.
FIG. 8(b) is a graph of OSNR values measured from our method as a function of actual OSNR obtained from an OSA (in case of no GVD) for 640 Gbit/s DPSK signals

To verify our OSNR measurement, we compare the OSNR values measured from our technique to values obtained using an OSA for both 40 Gbit/s NRZ-DPSK and 640 Gbit/s RZ-DPSK signals. FIG. 8 shows good agreement between two methods with high monitoring accuracy (error <1.2 dB for 40 Gbit/s NRZ-DPSK and error <0.5 dB for 640 Gbit/s RZ-DPSK). Note that GVD=0 ps/nm in these measurements.

III. Discussions

The multi-impairment monitoring approach is based on the measurements of power $P_1$ and $P_2$ (shown in FIGS. 4 and 7) which are the RF power at lower frequency (from the CW probe to the first RF clock tone) and at higher frequency (from the second to the third tone). Therefore sufficient measurement bandwidth is a key determinant that decides the accuracy of this monitoring approach.

TABLE I

THE PERFORMANCE OF NONLINEAR MEDIA

| Nonlinear Media | $\gamma^*$ ($W^{-1}km^{-1}$) | $D^*$ (ps/nm/km) | $S^*$ (ps/nm²/km) | L (m) |
|---|---|---|---|---|
| $As_2S_3$ planar waveguide | 9900 | 28.6 | 0.62 | 0.068 |
| Silica HNLF | 20 | 0.5 | 0.026 | 33.66 |
| Silica DSF | 3 | 0.5 | 0.08 | 224.4 |

*at 1550 nm wavelength

Three different nonlinear media, including ChG dispersion-shifted planar waveguide and two popular media, HNLF and DSF, whose key parameters are shown in Table 1, are studied in this section. Note that losses are ignored in our numerical investigation and operating powers are kept similarly in both simulation and experiment. For the purpose of comparing different waveguides, our analysis assumes an equal $\gamma \cdot L$ product of 0.6732 $W^{-1}$. This gives an equivalent length of HNLF and DSF of 33.66 m and 224.4 m, respectively.

The 3-dB bandwidth of this monitoring scheme is numerically characterized using a sinusoidal wave created by the interference of two CW lasers with relatively narrow wavelength separation centered at $\lambda_s$=1542.5 nm. A third CW probe at $\lambda_p$=1570 nm is coupled with this beat signal through investigated media [25, 27, 30].

FIG. 10 illustrates the power of the XPM tone generated around the probe wavelength while increasing the beat frequency, which are 3-dB bandwidths of this technique. Our numerical model used the nonlinear Schrodinger equations [24] to simulate second order $\beta_2$ and third order $\beta_3$ dispersion as well as nonlinear effects $$\frac{\partial A}{\partial z} + j\frac{\beta_2 \partial^2 A}{2\partial T^2} - \frac{\beta_3 \partial^3 A}{6\partial T^3} = j\gamma\left[|A|^2 A + j\frac{\partial(|A|^2 A)}{\omega_0 \partial T} - T_R A \frac{\partial |A|^2}{\partial T}\right] \quad (12)$$

where A is the varying envelop and $T_R$ is the Raman response time which is set to 3 fs. Note that propagation loss is ignored in this equation.

Figure 9:
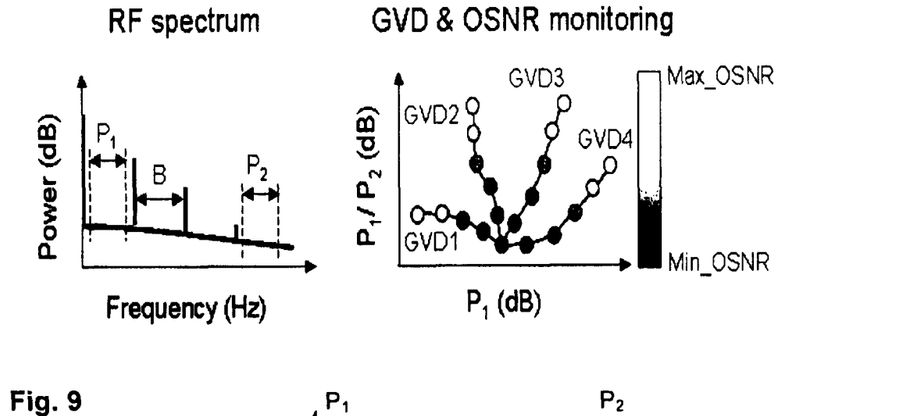
FIG. 9 is a schematic diagram of a monolithic integrated circuit waveguide with filters etched into the waveguide, and detectors.

Finally, FIG. 9 shows the detailed architecture of the photonics chip 2 with the signal 14 input into the end of waveguide 70, and the CW probe signal 16 injected from the on chip laser 72. The waveguide 70 splits into two sub-channels 74 and 76 which are etched with bandpass filters 78 and 80 to extract $P_1$ and $P_2$ respectively. Slow detectors 82 and 84 are also integrated into the chip 2, as is a processor 86 that outputs $P_1$ and $P_2$ for multi-impairment monitoring. The inserts show the RF spectrum and the GVD and OSNR monitoring results coming from it.

REFERENCES

[1] A. H. Gnauck and P. J. Winzer, "Optical Phase-Shift-Keyed Transmission," *J. Lightw. Technol.*, vol. 23, no. 1, pp. 115-130, Jan. 2005.

[2] C. Schmidt-Langhorst, R. Ludwig, D.-D. Groβ, L. Molle, M. Seimetz, R. Freund, and C. Schubert, "Generation and Coherent Time-Division Demultiplexing of up to 5.1 Tb/s Single-Channel 8-PSK and 16-QAM Signals," in *Proc. Optical Fiber Communication Conference (OFC)*. San Diego, USA; Paper PDPC 6, 2009 (Postdeadline Paper).

[3] H. C. H. Mulvad, M. Galili, L. K. Oxenløwe, H. Hu, A. T. Clausen, J. B. Jensen, C. Peucheret, and P. Jeppesen, "Demonstration of 5.1 Tbit/s data capacity on a single-wavelength channel," *Opt. Express*, vol. 18, no. 2, pp. 1438-1443, Jan. 2010.

[4] A. D. Ellis, J. Zhao, and D. Cotter, "Approaching the Non-Linear Shannon Limit," *J. Lightw. Technol.*, vol. 28, no. 4, pp. 423-433, February 2010.

[5] A. Sano. H. Masuda, T. Kobayashi, M. Fujiwara, K. Horikoshi, E. Yoshida, Y. Miyamoto, M. Matsui, M. Mizoguchi, H. Yamazaki, Y. Sakamaki, and H. Ishii, "69.1-Tb/s (432× 171-Gb/s) C- and Extended L-Band Transmission over 240 Km Using PDM-16-QAM Modulation and Digital Coherent Detection," in *Proc. Optical Fiber Communication Conference (OFC)*, San Diego, USA, Paper PDPB 7, 2010 (Postdeadline Paper).

[6] A. H. Gnauck, P. J. Winzer, S. Chandrasekhar, X. Liu, B. Zhu, and D. W. Peckham, "10×224-Gb/s WDM Transmission of 28-Gbaud PDM 16-QAM On A 50-GHz Grid Over 1,200 Km of Fiber," in *Proc. Optical Fiber Communication Conference (OFC)*, San Diego. USA, Paper PDPB 8, 2010 (Postdeadline Paper).

[7] X. Zhou, J. Yu, M.-F. Huang, Y. Shao, T. Wang, L. Nelson, P. Magill, M. Birk, P. I. Borel, D. W. Peckham, and R. Lingle, "64-Tb/s (640×107-Gb/s) PDM-36 QAM Transmission over 320 km Using Both Pre- and Post-Transmission Digital Equalization," in *Proc. Optical Fiber Communication Conference (OFC)*, San Diego, USA, Paper PDPB 9, 2010 (Postdeadline Paper).

[8] J.-X. Cai, Y. Cai, C. Davidson, D. Foursa, A. Lucero, O. Sinkin, W. Patterson, A. Pilipetskii, G. Mohs, and N. Bergano, "Transmission of 96×100 G Pre-Filtered PDM-RZ-QPSK Channels with 300% Spectral Efficiency over 10,608 km and 400% Spectral Efficiency over 4,368 km," in *Proc. Optical Fiber Communication Conference (OFC)*, San Diego, USA, Paper PDPB 10, 2010 (Postdeadline Paper).

[9] D. C. Kilper, R. Bach, D. J. Blumenthal, D. Einstein, T. Landolsi, L. Ostar, M. Preiss, and A. E. Willner, "Optical Performance Monitoring," *J. Lightw. Technol.*, vol. 22, no. 1, pp. 294-304, January 2004.

[10] Z. Pan, C. Yu, and A. E. Willner, "Optical performance monitoring for the next generation optical communication networks," *Opt. Fiber Technol.*, vol. 16, no. 1, pp. 20-45, January 2010.

[11] J. Zhao, A. P. T. Lau, K. K. Qureshi, Z. Li, C. Lu, and H. Y. Tam, "Chromatic Dispersion Monitoring for DPSK Systems Using RF Power Spectrum," *J. Lightw. Technol.*, vol. 27, no. 24, pp. 5704-5709, December 2009.

[12] C. Dorrer and X. Liu, "Noise Monitoring of Optical Signals Using RF Spectrum Analysis and Its Application to Phase-Shift-Keyed Signals." *IEEE Photon. Technol. Lett.*, vol. 16, no. 7, pp. 1781-1783, July 2004.

[13] H. Y. Choi, Y. Takushima, and Y. C. Chung, "Optical performance monitoring technique using asynchronous amplitude and phase histograms," *Opt. Express*, vol. 17, no. 26, pp. 23953-23958, December 2009.

[14] Z. Li, C. Lu, Y. Wang, and G. Li, "In-service signal quality monitoring and multi-impairment discrimination based on asynchronous amplitude histogram evaluation for NRZ-DPSK systems," *IEEE Photon. Technol. Lett.*, vol. 17, no. 9, pp. 1998-2000, September 2005.

[15] Z. Li and G. Li, "Chromatic Dispersion and Polarization-Mode Dispersion Monitoring for RZ-DPSK Signals Based on Asynchronous Amplitude-Histogram Evaluation," *J. Lightw. Technol.*, vol. 24, no. 7, pp. 2859-2866, July 2006.

[16] T. B. Anderson, A. Kowalczyk, K. Clarke, S. D. Dods, D. Hewitt, and J. C. Li, "Multi Impairment Monitoring for Optical Networks," *J. Lightw. Technol.*; vol. 27, no. 16, pp. 3729-3736, August 2009.

[17] D. A. Reid, K. Bondarczuk, K. J. Dexter, K. Shi, P. M. Anandarajah, L. P. Barry, W.-H. Guo, J. O'Dowd, M. Lynch, A. L. Bradley, and J. F. Donegan, "Two-Photon-Absorption-Based OSNR Monitor for NRZ-PSK Transmission Systems," *IEEE Photon. Technol. Lett.*, vol. 22, no. 5, pp. 275-277, March 2010.

[18] X. Liu, Y.-H. Kao, S. Chandrasekhar, I. Kang, S. Cabot, and L. L. Buhl, "OSNR monitoring method for OOK and DPSK based on optical delay interferometer," *IEEE Photon. Technol. Lett.*, vol. 19, no. 15, pp. 1172-1174, August 2007.

[19] D. Dahan, U. Mahlab, and D. Levy, "Stimulated Brillouin Scattering based In-Band OSNR Monitoring for 40 G and 100 G Deployment in Optical Networks with 100 GHz and 50 GHz Channel Spacing," in *Proc. Optical Fiber Communication Conference (OFC)*, San Diego, USA, Paper OWB4, 2010

[20] J.-Y. Yang, L. Zhang, X. Wu, O. F. Yilmaz, B. Zhang, and A. E. Willner, "All-Optical Chromatic Dispersion Monitoring for Phase-Modulated Signals Utilizing Cross-Phase Modulation in a Highly Nonlinear Fiber," *IEEE Photon. Technol. Lett.*, vol. 20, no. 19, pp. 1642-1644, October 2008.

[21] T. D. Vo, M. D. Pelusi, J. Schröder. B. Corcoran, and B. J. Eggleton, "Multi-Impairment Monitoring at 320 Gb/s based on Cross Phase Modulation Radio-Frequency Spectrum Analyzer," *IEEE Photon. Technol. Lett.*, 2010.

[22] T. D. Vo, M. D. Pelusi, J. Schröder, F. Luan, S. J. Madden, D.-Y. Choi, D. A. P. Bulla, B. Luther-Davies, and B. J. Eggleton, "Simultaneous multi-impairment monitoring of 640 Gb/s signals using photonic chip based RF spectrum analyzer," *Opt. Express*, vol. 18, no. 4, pp. 3938-3945, February 2010.

[23] T. D. Vo, H. Hu, M. Galili, E. Palushani, J. Xu, L. K. Oxenløwe, S. J. Madden, D. Y. Choi. D. A. P. Bulla, M. D. Pelusi: J. Schröder, B. Luther-Davies, and B. J. Eggleton, "Photonic Chip Based 1.28 Tbaud Transmitter Optimization and Receiver OTDM Demultiplexing," in *Proc. Optical Fiber Communication Conference (OFC)*, San Diego, USA, Papers PDPC 5, 2010 (Postdeadline paper).

[24] G. P. Agrawal, *Nonlinear Fiber Optics,* 3rd ed.: California: Academic Press, 2001.

[25] C. Dorrer and D. N. Maywar, "RF Spectrum Analysis of Optical Signals Using Nonlinear Optics," *J. Lightw. Technol.*, vol. 22, no. 1, pp. 266-274, January 2004.

[26] A. F. Elrefaie, R. E. Wagner, D. A. Atlas, and D. G. Daut, "Chromatic Dispersion Limitations in Coherent Lightwave Transmission Systems," *J. Lightw. Technol.*, vol. 6, no. 5, pp. 704-709, May 1988.

[27] M. D. Pelusi, T. D. Vo, F. Luan, S. J. Madden, D.-Y. Choi, D. A. P. Bulla, B. Luther-Davies, and B. J. Eggleton, "Terahertz bandwidth RF spectrum analysis of femtosecond pulses using a chalcogenide chip," *Opt. Express*, vol. 17, no. 11, pp. 9314-9322, May 2009.

[28] J. M. Harbold, F. Ö. Ilday, F. W. Wise, J. S. Sanghera, V. Q. Nguyen, L. B. Shaw, and I. D. Aggarwal, "Highly nonlinear As—S—Se glasses for all-optical switching," *Opt. Lett.*, vol. 27, no. 2, pp. 119-121, January 2002.

[29] D.-Y. C. S. Madden, D. A. Bulla, R. Wang, A. Rode, and B. Luther-Davies, "Submicrometer-Thick Low-Loss $As_2S_3$ Planar Waveguides for Nonlinear Optical Devices." *IEEE Photon. Technol. Lett.*, vol. 22, no. 7, pp. 495-497, April 2010.

[30] M. Pelusi, F. Luan, T. D. Vo, M. R. E. Lamont, S. J. Madden, D. A. Bulla, D. Y. Choi, B. Luther-Davies, and B. J. Eggleton, "Photonic-chip-based radio-frequency spectrum analyser with terahertz bandwidth," *Nature Photon.*, vol. 3, no. 3, pp. 139-143, February 2009.

[31] M. D. Pelusi, F. Luan, E. Magi, M. R. Lamont, D. J. Moss, B. J. Eggleton, J. S. Sanghera, L. B. Shaw, and I. D. Aggarwal, "High bit rate all-optical signal processing in a fiber photonic wire," *Opt. Express*, vol. 16, no. 15, pp. 11506-11512, July 2008.

[32] M. A. F. Roelens, S. Frisken, J. A. Bolger, D. Abakoumov, G. Baxter, S. Poole, and B. J. Eggleton, "Dispersion Trimming in a Reconfigurable Wavelength Selective Switch," *J. Lightw. Technol.*, vol. 26, no. 1, pp. 73-78, January 2008.

The invention claimed is:

1. An optical device for real-time multi-impairment signal performance monitoring comprising:
    a waveguide having:
        an input region to receive a signal for testing, and a narrow band CW laser signal,
        a non-linear waveguide region to mix the two received signals, and
        more than one output region, each equipped with bandpass filters that extract respective discrete frequency bands of the RF spectrum of the mixed signals; and
    power detectors to output extracted discrete frequency banded signals.

2. An optical device according to claim 1, further comprising a laser to provide the narrow band CW laser signal.

3. An optical device according to claim 1, wherein the mixing results in cross-phase modulation.

4. An optical device according to claim 1, wherein the integrated bandpass filters are etched onto the waveguide using lithographic techniques.

5. An optical device according to claim 1, wherein the filters are Bragg gratings.

6. An optical device according to claim 1, wherein the filters are Array Waveguide gratings (AWG).

7. An optical device according to claim 1, wherein there are only two optical band-pass filters and slow power detectors.

8. An optical device according to claim 1, further comprising a processor to perform RF spectrum analysis of the discrete frequency banded signals.

9. An optical device according to claim 1, wherein the device is fabricated from silicon.

10. An optical device according to claim 1, wherein the waveguide is fabricated from silicon.

11. An optical device according to claim 1, wherein the waveguide is a dispersion engineered, highly nonlinear Chalcogenide (ChG) rib waveguide.

12. An optical device according to claim 1, wherein the waveguide is a nonlinear optical fiber.

13. An optical device according to claim 8, wherein the features observed on the RF spectrum are directly utilized to perform simultaneous group velocity dispersion and in-band optical signal-to-noise ratio monitoring.

14. An optical device according to claim 8, wherein, based on the relationship between signal impairments and the RF spectra or autocorrelation traces, the processor monitors GVD, OSNR and timing jitter simultaneously with high measurement dynamic ranges.

15. An optical device according to claim 1, wherein the power detectors are slow power detectors.

16. An optical device according to claim 1, that receives a signal for testing that is modulated according to any one of the following types of modulation:
    on-off keying,
    differential phase shift keying (DPSK),
    differential quadrature phase shift keying (QPSK), and
    optical time division multiplexing (OTDM).

17. An optical device according to claim 1, wherein the device is a monolithic integrated photonics chip in which the input, non-linear waveguide and output regions are integrated.

18. An optical device according to claim 8, wherein a processor region is also integrated with the other regions of the device.

* * * * *

UNITED STATES PATENT AND TRADEMARK OFFICE
CERTIFICATE OF CORRECTION

PATENT NO. : 9,042,685 B2  
APPLICATION NO. : 13/806153  
DATED : May 26, 2015  
INVENTOR(S) : Trung Duc Vo et al.

Page 1 of 1

It is certified that error appears in the above-identified patent and that said Letters Patent is hereby corrected as shown below:

In the specification

Column 3, Line 62, that portion of the formula reading " $(2\pi \cdot n_2)/\lambda \cdot A_{\mathit{eff}})$ ,"
should read -- $(2\pi \cdot n_2)/(\lambda \cdot A_{\mathit{eff}})$ --.

Column 4, Equation 4, that portion of the formula reading " $S_p(f)|F[E'_p(t)]|^2$ ,"
should read -- $S_p(f) = |F[E'_p(t)]|^2$ --.

Signed and Sealed this  
Twentieth Day of October, 2015

Michelle K. Lee  
*Director of the United States Patent and Trademark Office*